July 28, 1936.  J. T. ZAK  2,048,722
RANGE FINDING, HORIZONTAL ANGLE MEASURING, AND ANGLE OF SITE INSTRUMENT
Filed Dec. 11, 1934
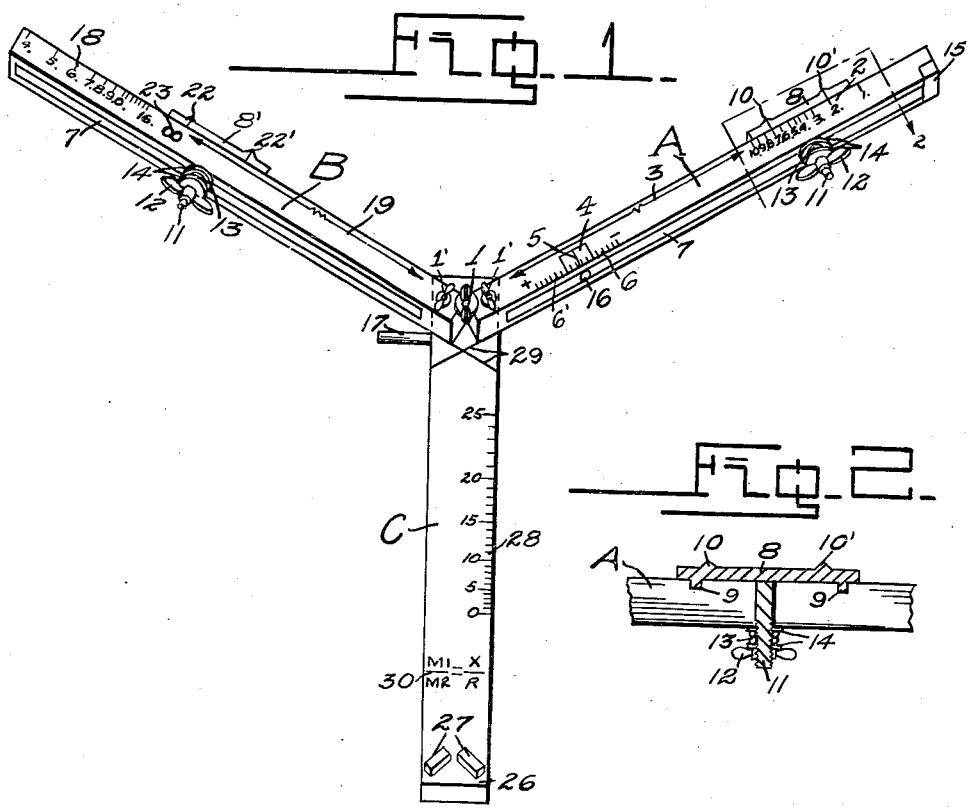
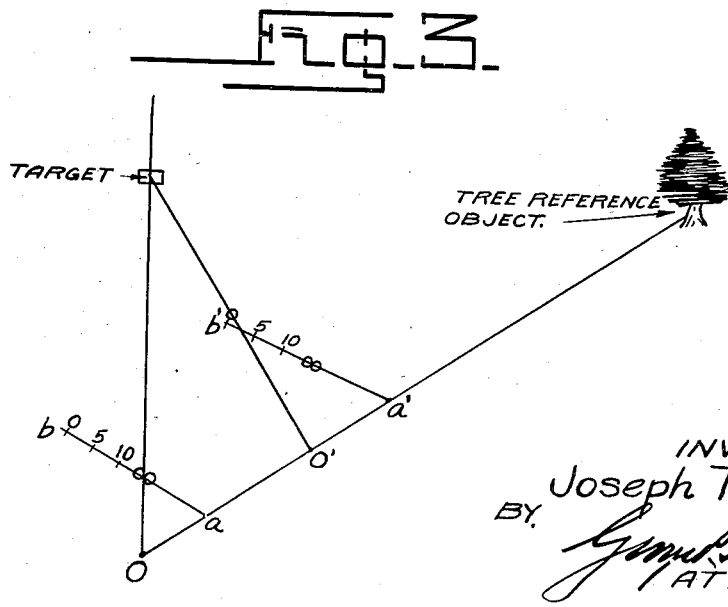
INVENTOR.
Joseph T. Zak.
BY
ATTORNEY.

Patented July 28, 1936

2,048,722

UNITED STATES PATENT OFFICE 2,048,722

RANGE FINDING, HORIZONTAL ANGLE MEASURING, AND ANGLE OF SITE INSTRUMENT

Joseph T. Zak, Fort Benning, Ga.

Application December 11, 1934, Serial No. 756,992

7 Claims. (Cl. 33—65)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a range finding, horizontal angle measuring and angle of site instrument, and the primary object thereof is to provide an instrument of this character which is adapted to be easily and quickly operated to any position for determining the range, horizontal angle and angle of site to meet the conditions of direct and indirect laying (overhead fire) with a machine gun or the like.

Another object of my invention is to provide a range finding, horizontal angle measuring and angle of site instrument which is simple in construction, efficient in use, light in weight, and which is not liable to get out of order.

With the above and other objects and advantages in view, the invention specifically consists in features of construction, arrangement and operation of parts which will hereinafter appear. For purposes of illustration, the invention will be described and claimed with reference to the accompanying drawing in which like numbers distinguish like parts and in which—

Fig. 1 is a perspective view of my invention;

Fig. 2 is a horizontal sectional view taken through the slot and slide of one of the arms.

Fig. 3 is a diagrammatic view illustrating the manner of solving a range problem with the instrument;

In carrying out my invention with the form of instrument illustrated in Figs. 1 to 3 inclusive of the drawing, a trio of arm members A, B and C, made of any suitable material such as aluminum or wood are provided which are pivotally connected together at one end by any suitable means such as a bolt, washer and nut construction 1. By pivotably connecting the arm members A, B and C together the instrument may be easily and quickly adjusted to an operative position, or be folded when not in use to reduce the size thereof. In order to hold individually the arm members A and B in adjusted angular position on the arm member C, suitable means such as the bolt, washer and nut construction 1', are provided on each of the arm members A and B.

The arm member A is provided with a range corrector scale 2 which provides a range corrector for varying angles of a target observer reference object, i. e., in per cent of correction required, and a mil scale 3 illustrated by the symbol consisting of a double-headed arrow with a wavy central portion because of the small scale of the drawing. The scale 3 is inscribed along the entire forward upper edge of the arm member and is superimposed on the range corrector scale 2 where the two scales 2 and 3 work jointly. A sight comprising a mirror 4 containing a horizontal reference line 5 is provided on the lower side edge of the arm member A adjacent the pivoted end thereof. From the line 5 as zero, a plus mil scale 6 is inscribed on one side thereof along the edge of the arm member and a minus mil scale 6' is inscribed on the other side thereof. The arm members A and B are each provided with a bolt receiving slot 7 which extends across the entire width of the arm members and longitudinally thereof. Slidably mounted on the forward side of each of the arm members A and B are sighting slides 8 and 8' respectively having centrally located bolts 11 and studs 9 provided thereon, which are adapted to work in the slots 7, while the upper surface of the sighting slides 8 and 8' are provided with aiming marks 10 and 10' and 22 and 22' respectively. The studs 9 are provided to prevent rotation of the slides 8 and 8' on the arm members A and B. The bolts 11 on the slide 8 and 8' project through the respective slots 7 and are provided with nuts 12, coil springs 13, and washers 14 on the free end thereof for adjustably setting the sighting slides 8 and 8' along the arm members A and B. In order to freely move the sighting slides 8 and 8' along the arm members A and B, the nuts 12, which in the present illustration are shown as wing nuts, are unscrewed until there is but a slight tension of the spring 13 between the washers 14, and when it is desired to clamp the sighting slides 8 and 8' in adjusted position on the arm members the wing nuts 12 are tightened. The arm member A is further provided with a weight 15 and a pin receiving aperture 16. The weight 15 is attached to the outer end of the arm member and provides means for holding the instrument in proper operative position while the aperture 16 is adapted to receive a pin 17 provided on the arm member C when the instrument is being used for determining the angle of site of a given object.

The arm member B is provided with a range scale 18 which in the present instance is marked to read ranges from 400 to 1600 yards and a mil scale 19 both of which are inscribed on the forward upper edge thereof. The mil scale 19, which is illustrated by the symbol consisting of a double-headed arrow with a wavy central portion because of the small scale of the drawing is superimposed upon the range scale 18 where the range scale 18 and the mil scale 19 work jointly.

The range scale 18 of arm member B is based on the following formula: RM equals 1000 W where R is the range, M the angular width in mils of the target or base line, and W the lineal width of the target or base line. In the present case the range scale 18 is calculated for a base line of fifty yards where the base line and reference object are at right angles to the observer target line and the range scale of the instrument is held at a computed constant distance from the eye of the user of the instrument. Inasmuch as the direction of the base line will vary with the position of the reference object (the object which determines the direction of base line) the actual W of the formula will become less as the angle target-observer-reference object becomes less and the actual range reading will be correspondingly greater than the correct range reading.

The arm member C is provided with a mountpiece 26 containing raised teeth stops 27 and a range scale 28 inscribed in mils which is used in conjunction with the plus and minus angle of site scale on arm member A for computing the quadrant elevations. Inscribed on the pivoted end of the arm member C are lines 29 which are in prolongation of the inner edge of the arm members A and B when these arm members are in operative position on the arm member C. The lines 29 are provided for assuring uniformity of distance of the arm members A and B from the aiming eye of the observer when the device is in operative position by defining the angular operative position of the arm members A and B with respect to each other and with the arm member C. A mathematical equation 30 may also be inscribed on the arm member C to provide a reference for the determination of the range at any time while advancing on or retreating from a given target of which a prior range and subtended mil reading is known; M1 of the equation 30 equaling the initial subtended mil reading, R1 the initial range when M1 was determined, M2 the mil reading at time new range is desired, and X the desired new range.

The method of employing the instrument illustrated in Figs. 1, 2, and 3 of the drawing for the determination of ranges and horizontal angle measuring, is as follows: Assuming the arm members A, B and C of the instrument have been unfolded, and the arm members A and B have been adjusted on the arm member C in prolongation of the lines 29 and clamped in place by the bolt and nut construction 1' provided on each of the arm members A and B, the instrument is ready for use in determining ranges and horizontal angle measuring. Referring to Fig. 3 of the drawing, a and a' and b and b' designate points or positions on the arm members A and B of the instrument including the range scale 18 on the arm member B and the range correction scale 2 of the arm member A. The observer stationed at 0 slides the sighting slide 8' on the arm member B until the aiming mark 22 on the left side thereof rests opposite the infinity mark 23. The observer then clamps the sighting slide to the arm member and places the mouthpiece 26 of arm member C in his mouth, with his teeth against the teeth stops 27. The observer, holding the instrument lightly with both hands, raises it along the line of vision toward the target and places the aiming mark 22 on the left side of the sighting slide 8' under the target. He next selects a convenient and distant reference object such as a tree which intercepts the arm member A and with the right hand slides the sighting slide 8 on arm member A so that the aiming mark 10' on the right hand side thereof intercepts the reference object. The observer now has the left aiming mark 22 of the slide 8' on arm member B on the target and the aiming mark 10' on the right side of the sighting slide 8 on arm member A on the reference object in which case he clamps the sighting slide 8 to the arm member A by means of its nut 12. If the observer desires to take the ranges to other objects intercepting the arm member B with the use of the same base line, he takes a pencil note of the position of the aiming mark on sighting slide 8 for each target. He can do this since the arm member A is marked off in the mil rule in units so small as to permit accurate plotting of position of aiming mark.

The observer now moves the selected length of the base line in the direction of the reference object and at the point 0' (the other end of the base line) as indicated in Fig. 3 of the drawing, he takes a second observation by sighting the end of the instrument, i. e., right aiming mark 10' on slide 8, which is clamped at the position determined by 0 or clamped successively at different positions for range reading of corresponding targets and then slides the sighting slide 8' of arm member B to the left until the aiming mark 22 thereof intercepts the target. The observer then takes the instrument out of his mouth and notes that the range as for example 250 yards is indicated exactly by the position of the aiming mark 22 opposite the inscribed range scale 18. The observer also notes that the position of a or a' in Fig. 3 or the position of the reference object on the arm member A is indicated by the aiming mark 10' on the right of the sighting slide 8. The range corrector scale 2 on the arm member A adjacent the slide 8 indicating the amount of correction required to have a true reading of the range, as for example, the numeral 2 of the range corrector scale 2 indicates that the operator must subtract two percent from the range reading of 250 yards to have the correct reading.

Good results may be obtained without the use of sighting slides 8 and 8' by means of making reading and observation directly from range scale and range corrector scale. In this case initial adjustment is made by placing infinity mark ∞ on the target and a given percent line or mark on the percent corrector scale adjacent to the selected reference object which is brought to coincide with that object by means of loosening the nut and bolt construction 1, to which the arm members A, B and C, are pivotally connected and swinging arm member A until such coincidence is accomplished, and at 0' as illustrated in Fig. 3 of the drawing the observer places the reference object in line with the previously selected percent corrector mark, at the same time glancing toward the range scale to see where the target intercepts the range scale, which is the range as read to be corrected by the subtraction of the indicated percent of correction as previously noted on the arm member A.

For the sake of accuracy and convenience the normal base line of fifty yards may be varied in practice. A 25-yard base line has given an average of about 2% error for ranges up to 500 yards, but when using the 25-yard base line the final range reading must be balanced. For results of precision at distant ranges a 50-yard base line can be used leaving the final range reading as read. In extremely long ranges the base line can be doubled for accuracy, hence the final range reading must be doubled to secure correct range. It is possible to accurately take the range to target several thousand yards distant provided the base line is correspondingly increased.

When a suitable reference object cannot be located to the right of the target, one can be selected to the left thereof and the procedure in determining range will be the same except that the infinity mark (∞) will be placed on the reference object and the target will coincide with some point on the range corrector scale. The mil scales 3 and 19 on the arm members A and B respectively, afford a means of measuring horizontal angles. The sighting slides 8 and 8' on the arm members A and B respectively with the aiming marks 10, 10' and 20, 20' provided thereon are similarly used in determining the left and right sides of an angle measured in mils.

In determining angles of site of a given object the arm members A and B are removed from the arm member C, and the arm member A is pivoted on arm member C by means of a hole 16 provided thereon, in which the pin 17 on arm member C is adapted to be inserted, with the mirror 4 facing the end 26 of arm member C and the horizontal reference line 5 lying in the same plane as the axis of the pivoted connection of the arm members A and C. This angle of site measuring feature of the instrument together with the means for the computation of quadrant elevations, is the same in principle as disclosed in my prior Patent No. 1,723,456, with the exception that the image of the pupil of the aiming eye is bisected by the horizontal reference line 5, in the mirror 4 when determining and maintaining the horizontal level of the instrument, since there is no peep site or rear site for the instrument in this case, the image of the pupil of the aiming eye must be bisected by the horizontal reference line 5 of the mirror 4, on arm member A, for leveling the instrument. In order to make the mil rule and angle of site scales uniformly applicable to all observers using the same instrument without the use of an individual corrector, the instrument should be held so that the end of the arm member C containing the mouthpiece 26 is held against the cheek just under the aiming eye. If individual corrections are known the instrument can be held in the mouth with the teeth against the teeth stops 27 as for finding the range, thus giving greater steadiness to the instrument.

The above disclosed instruments can be used in a sitting, kneeling, standing or prone position. It has been found in using the instruments that the position for obtaining the greatest steadiness thereof is in the sitting position with the elbows resting on the knees and the breath held as in firing a rifle. When using the instrument in the prone position the observer lies on his back, feet toward the target and head raised above the breast. For measuring the base line a five or ten yard length of any suitable wire, such as picture wire, may be used. A good string gives satisfactory results. Careful pacing of base line eliminates the need of a string.

Having described my invention, what I claim as new and wish to secure by Letters Patent is:

1. A range finding, horizontal angle measuring and angle of site instrument comprising a trio of arm members pivotally connected together, one of said arm members providing means for holding the other of said arm members a predetermined distance from the free end thereof and means provided on said first mentioned arm member defining the angular operative position of said last mentioned arm members with respect to each other and with said first mentioned arm member.

2. A range finding, horizontal angle measuring and angle of site instrument comprising a trio of separable arm members pivotally connected together, one of said arm members providing means for holding the other of said arm members a predetermined distance from the free end thereof and a sighting member having aiming marks slidably mounted on each of the last mentioned arm members.

3. A range finding, horizontal angle measuring and angle of site instrument comprising a plurality of arm members pivotally connected together at one end, the free end of one of said arm members adapted to be held in the mouth of the observer for holding the other of the said arm members a predetermined distance with respect to his eye, a sighting slide having aiming marks slidably mounted on each of said last mentioned arm members and means for holding said slides in adjusted position on said arm members.

4. A range finding, horizontal angle measuring and angle of site instrument comprising a trio of separable arm members pivotally connected together at one end, the free end of one of said arm members adapted to be held in the mouth of the observer for holding the other of said arm members a predetermined distance with respect to his eye, a slot and an adjustable sighting device containing aiming marks provided on each of said last mentioned arm members, each of said sighting devices having a projecting portion adapted for insertion through the slot of said arm members, and means on said projecting portions for holding said sighting devices in adjusted position on said arm members.

5. A range finding, horizontal angle measuring and angle of site instrument comprising a trio of separable arm members pivotally connected together at one end, and adapted to be adjusted in angular relation to each other, means for holding said arm members in adjusted angular relation, a slot and an adjustable sighting device containing aiming marks provided on two of said arm members, a bolt and guide means provided on each of said sighting devices, said bolt adapted to project through the slot of said last mentioned arm members, and said guide means adapted to work in said slots, means on said bolts for holding said sighting devices in adjusted position on said arm members, means on the other of said arm members defining the angular operative position of the first mentioned arm members, with respect thereto and with each other, and a mouth piece provided thereon, said mouth piece adapted to be held in the mouth of the observer for holding said first mentioned arm members a predetermined distance with respect to his eye.

6. A range finding, horizontal angle measuring and angle of site instrument, comprising a plurality of separable arm members pivotally connected together at one end, and adapted to be adjusted in angular relation to each other, means for holding said arm members in adjusted angular relation, one of said arm members adapted to be held in the mouth of the observer for holding the other of said arm members at a predetermined distance with respect to his eye, a sighting slide containing aiming marks slidably mounted on each of said last mentioned arm members, one of said last mentioned arm members bearing a plus and minus angle of site scale, a reflecting surface bearing a reference at the zero of the scale, and a weight on the free end of said arm member, said last mentioned arm member adapted to be removed from its pivoted connection, and pivoted adjacent the inner end of said first mentioned arm member on the line of the zero of said scale.

7. A range finding, horizontal angle measuring and angle of site instrument comprising a trio of separable arm members pivotally connected together at one end, and adapted to be adjusted in angular relation to each other, separate means on two of said arm members for holding said arm members in adjusted angular position, with respect to each other and with the other arm member, means on said last mentioned arm member defining the angular operative position of the first mentioned arm members with respect thereto and to each other, a longitudinally extending slot and an adjustable sighting device containing aiming marks provided on each of said first mentioned arm members, a bolt and guide means provided on each of said sighting devices, said bolt and guide means adapted to work in the slots of said arm members, a mouth piece including teeth stops provided on the free end of the said other arm member, said mouth piece adapted to be held in the mouth of the observer for holding the first mentioned arm members a predetermined distance from his eye, one of said first mentioned arm members bearing a plus and minus angle of site scale, a reflecting surface bearing a reference at the zero of the scale and a weight on the free end of said arm member, said last mentioned arm member adapted to be removed from its pivoted connection, and pivoted adjacent the inner end of the arm member containing said mouth piece on the line of the zero of said scale.

JOSEPH T. ZAK.